United States Patent [19]

Georges et al.

[11] Patent Number: 5,205,716

[45] Date of Patent: Apr. 27, 1993

[54] COMPOSITE MATERIAL TURBINE WHEEL

[75] Inventors: Jean-Michel Georges, Gradignan; Jacques G. Fouillot, Floirac, both of France

[73] Assignee: Societe Europeenne de Propulsion, Surenes, France

[21] Appl. No.: 768,385

[22] Filed: Sep. 30, 1991

[30] Foreign Application Priority Data

Oct. 2, 1990 [FR] France ............................ 90 12133

[51] Int. Cl.⁵ ............................................. F01D 5/02
[52] U.S. Cl. ............................ 416/229 A; 416/241 B; 416/244 A; 403/380
[58] Field of Search .......... 416/170 R, 204 A, 229 A, 416/241 B, 244 A; 192/108; 74/457; 403/337, 359, 380

[56] References Cited

U.S. PATENT DOCUMENTS

| | | | |
|---|---|---|---|
| 2,055,723 | 9/1936 | Hope | 192/108 |
| 2,479,039 | 8/1949 | Cronstedt | 416/244 A |
| 2,479,057 | 8/1949 | Bodger | 416/241 B |
| 3,916,495 | 11/1975 | Klassen et al. | 416/244 A |
| 4,123,199 | 10/1978 | Shimizu et al. | 416/241 B |
| 4,628,846 | 12/1986 | Vives . | |
| 4,790,052 | 12/1988 | Olry . | |

FOREIGN PATENT DOCUMENTS

| | | |
|---|---|---|
| 3005058 | 8/1980 | Fed. Rep. of Germany . |
| 1162697 | 9/1958 | France . |
| 1218404 | 5/1960 | France . |
| 2401888 | 3/1979 | France . |
| 866710 | 4/1961 | United Kingdom . |

*Primary Examiner*—Edward K. Look
*Assistant Examiner*—James A. Larson

[57] ABSTRACT

The wheel (10), which is made from a composite material having a ceramic matrix comprises a hub that bears a drive gear (16) formed of teeth (20) that extend radially on one of the wheel's surfaces (10a). Each tooth is asymmetrical with respect to the meridian plane (21) that passes through its apex, and has first shoulder (20b) that subtends an angle a, preferably between 15° and 45°, relative to that plane, and a second shoulder (20c) that subtends an angle b, preferably between 55° and 85°, relative to that plane. Advantageously, the sum of the two angels is at least equal to 100°. The turbine wheel has an improved resistance against inter-laminar shear stresses that result from tightening to a drive gear wheel.

2 Claims, 3 Drawing Sheets

COMPOSITE MATERIAL TURBINE WHEEL

BACKGROUND OF THE INVENTION

1. Field of the Intention

The present intention relates to a composite material turbine wheel and, more particularly, to a turbine wheel in which a hub contains a drive gear composed of teeth extending radially from the one wheel's faces.

The intention applies more specifically to turbine wheels made of ceramic matrix type of composite material, such as used in gas turbines.

2. Prior Art

Thermostructural composite materials are noted for having mechanical properties that make them amenable for use in structural elements that face up to large stresses, and for being able to maintain those properties at high temperatures. These materials are composed of a fiber-based reinforcement and a matrix that densifies this reinforcement. The material forming the fiber reinforcement is either carbon or a ceramic, such as silicon carbide. The matrix material is either carbon (as in carbon-carbon composites), or a ceramic (as in a ceramic matrix composite material, otherwise known as CMC).

A CMC turbine wheel can be made from a fibrous preform consisting of plies of a two-dimensional texture, such as a carbon or ceramic cloth. The plies are piled on each other and may be linked together (e.g. by needling or thread implants). The preform is densified by the matrix material through a gaseous or liquid process. In the first case, the matrix is formed by chemical vapor infiltration using known methods. In the second case, the matrix is formed by impregnating a matrix precursor and transforming the precursor by a chemical process that will yield the matrix material.

After densification, the turbine wheel is machined to bring it down to its final dimensions and to form its drive gear.

FIGS. 1 and 2 show a wheel 1 made of a CMC type of composite material. The hub 2 has a classical drive gear 3 made of teeth 4 that extend radially from one of the wheel's faces 1. The wheel 1 is driven into rotation by a gearwheel 5 (shown in FIG. 2 only) affixed to a shaft 6 passing through the turbine wheel.

The gear section of wheel 5 is comprised of radially-extending teeth 8 shaped to conform with the teeth 4 with which it intermeshes. For the sake of convenience, the wheels 1 and 5 in FIG. 2 are shown spaced apart from each other along their common axis.

In operation, the turbine wheel 1 is driven into rotation by the gearwheel 5 against which it is forced into contact by tightening devices (not shown).

The pressure with which the gearwheel 5 applies this tightening force against the turbine wheel 1 creates stress concentrations at the roots of the cogs cut in the wheel to form the teeth 4, and induces large interlaminar stresses within the composite material forming the wheel 1. Indeed, as shown in the detailed view of a part of gear sections 3 and 7 depicted in FIG. 3, the tightening force (arrows F) causes reactions on the tooth shoulders along directions parallel to composite material's fiber reinforcement plies, creating the above-mentioned interlaminar stresses that can be a source of delamination (slippage between the plies).

SUMMARY OF THE INVENTION WHIT OBJECTS

It is an object of the present intention to overcome the aforementioned drawbacks by proposing a composite material turbine wheel whose radial teeth can be tightened against those of a drive wheel without risk of excessive strain in the composite material.

This object is achieved by means of a composite material turbine wheel of the type defined at the head of the description and in which, according to the invention, each tooth of its drive gear is asymmetrical with respect to a meridian plane that passes along an apex thereof, and present a first shoulder subtending an angle substantially comprised in a range of 15° to 45° with that plane, and a second shoulder subtending an angle substantially comprised in a range of 55° to 85° with that plane. Preferably, the sum of the two angles is at least equal to 100°.

Naturally, the turbine wheel is driven by a gearwheel whose tooth profile is complementary to that of the turbine wheel. When the drive gearwheel is tightened against the turbine wheel, the first shoulders serve essentially for centring the turbine wheel; thereafter, these first shoulders serve essentially for transmitting a drive torque. The tightening pressure is absorbed essentially by the teeth's second shoulders, the latter being but slightly inclined relative to the face of the wheel. This results in a decrease in the stresses at the root of the cogs, and hence in a lessened cogging effect exerted by the drive gearwheel, as well as a reduction in the shear stress due to the tightening force.

Preferably, the apices that form the crests and troughs of the teeth making up the gear portion of the turbine wheel converge towards a common point located on the wheel's axis. Accordingly, distortions such as thermally induced expansions occur in an isomorphic manner, so ensuring a permanent contact between the cooperating teeth of the turbine wheel and the drive gearwheel, even if there are some differences in the thermal expansion coefficients of the materials forming the respective wheels.

BRIEF DESCRIPTION OF THE DRAWINGS

The present invention shall be more clearly understood upon reading the following description, given purely by way of a non-limiting example, with reference to the appended drawings in which.

DETAILED DESCRIPTION OF THE PREFERRED EMBODIMENTS

Figure 2:
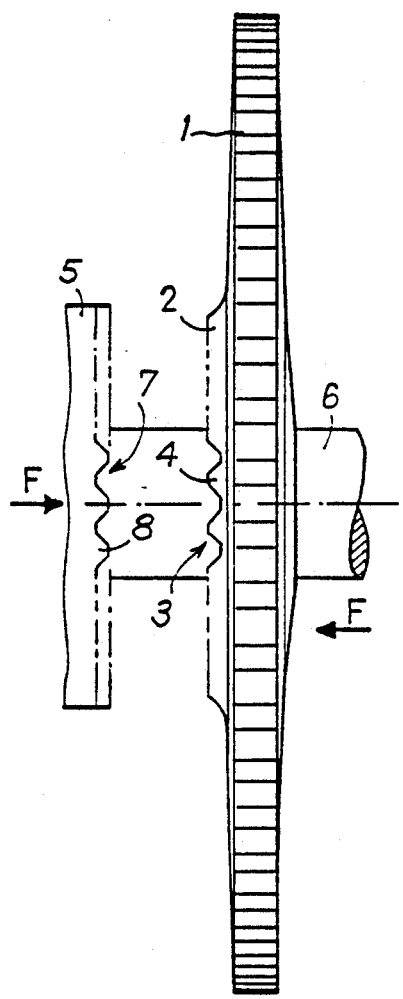
FIG. 2 is a side view of the turbine wheel of FIG. 1 and a drive gearwheel.
Figure 1:
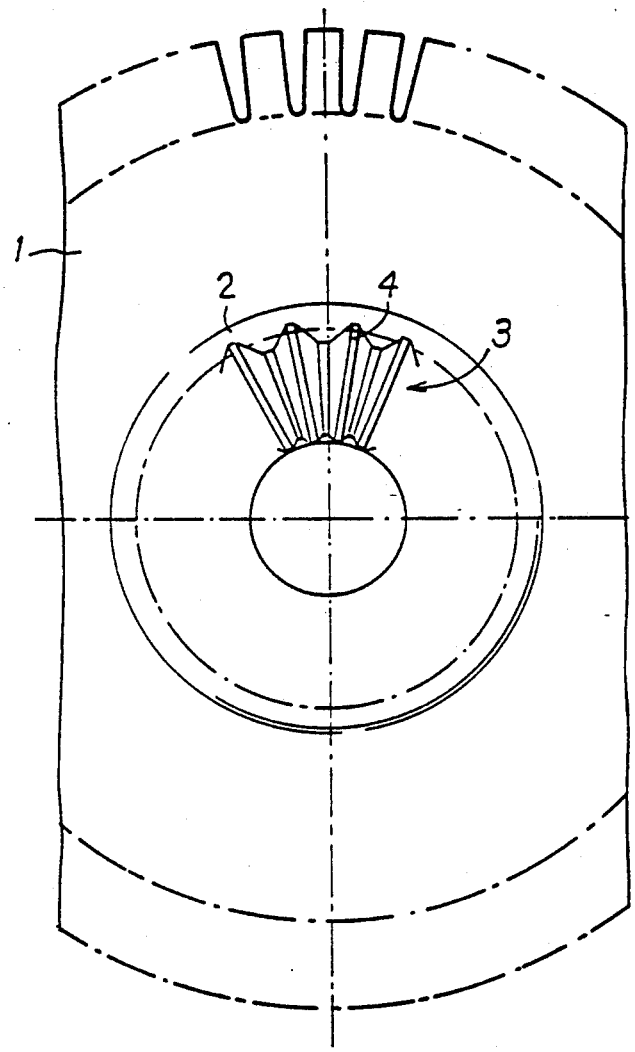
FIG. 1 is a partial view of a face of a turbine wheel containing a drive gear as in the prior art.
Figure 3:
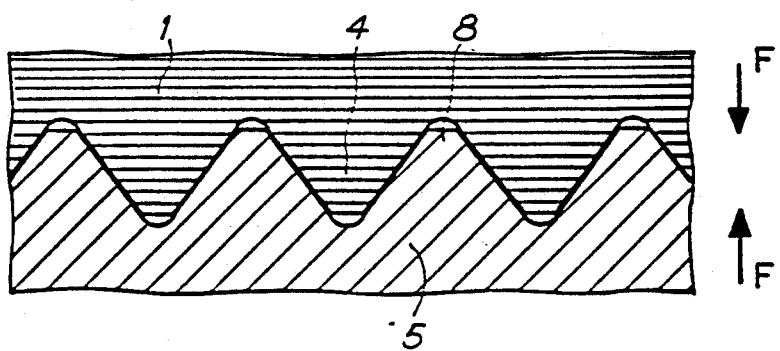
FIG. 3 is a partial detailed view showing the teeth of the turbine wheel and the drive gearwheel of FIG. 2.
Figure 4:
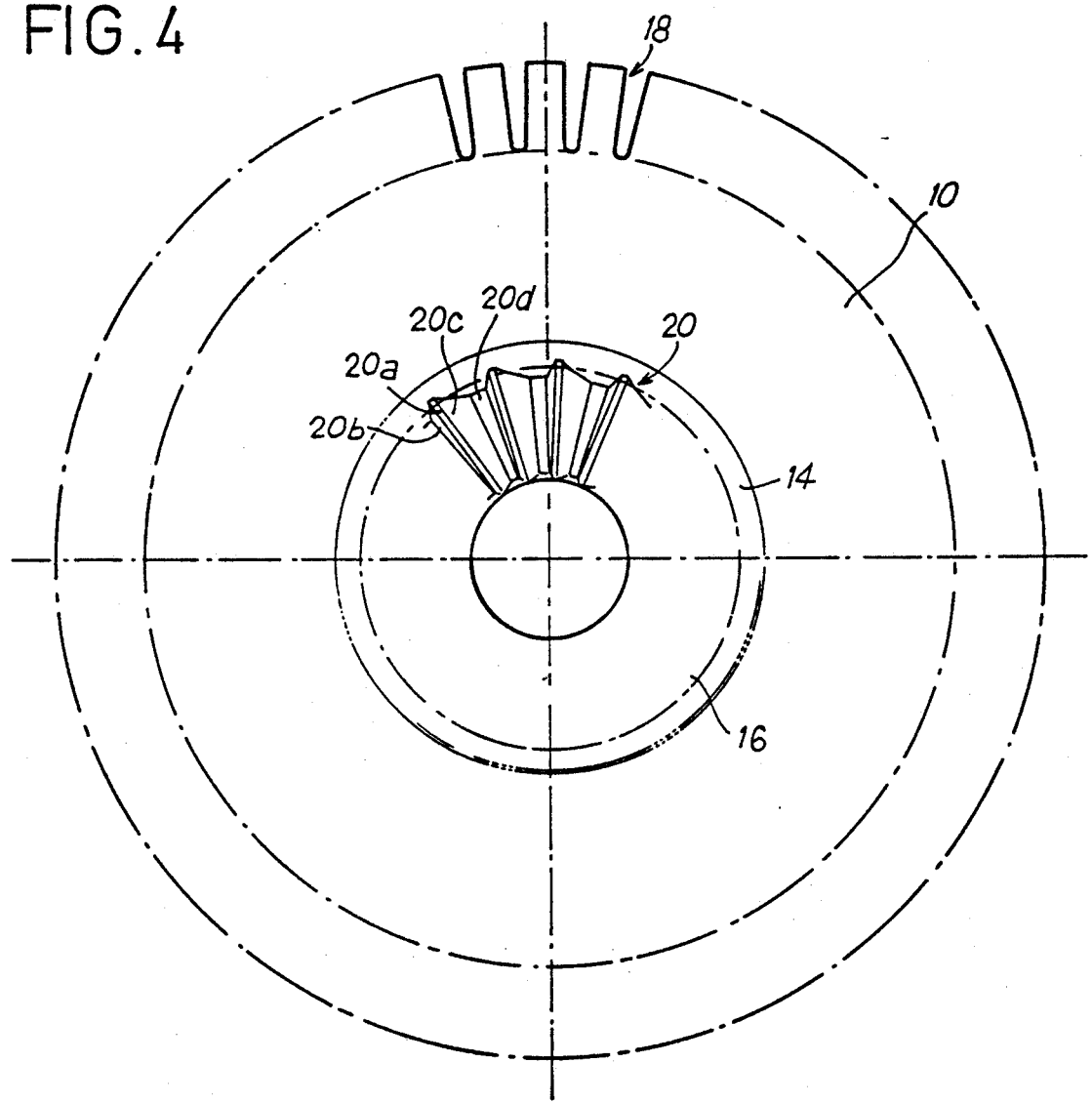
FIG. 4 is a partial front view of a turbine wheel containing a drive gear in accordance with the intention.
Figure 5:
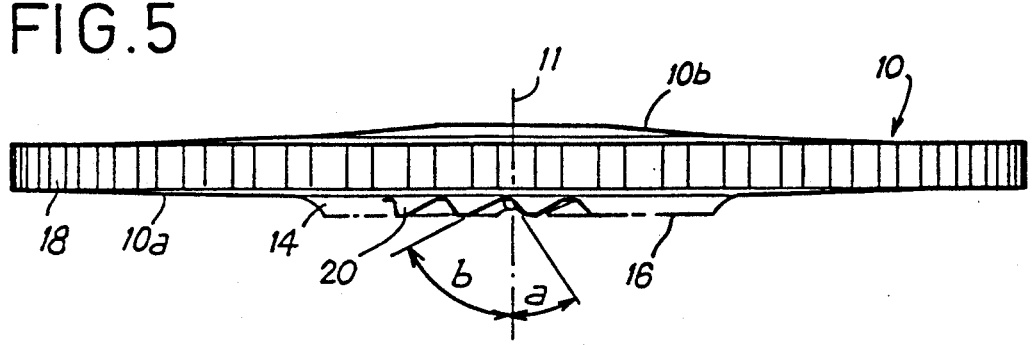
FIG. 5 is a side view of the turbine wheel of FIG. 4.
Figure 6:
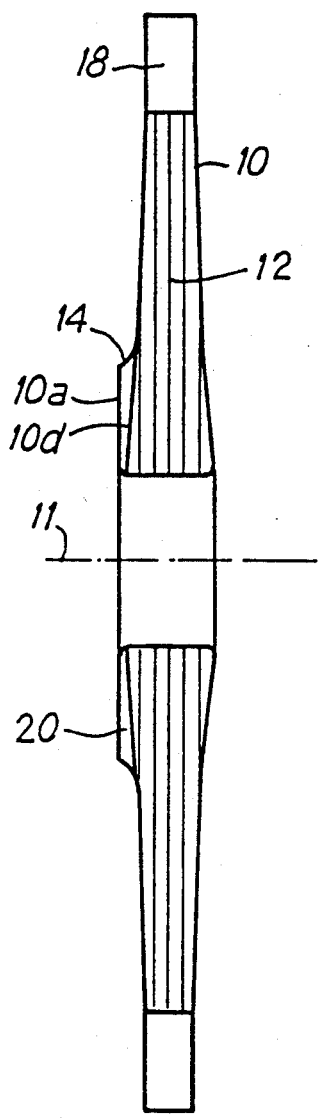
FIG. 6 is a side view through a longitudinal cross-section of the wheel shown in FIG. 4.

The turbine wheel 10 depicted in FIGS. 4 to 6 may, for example, be used in a gas turbine for a propulsive system. The turbine wheel is made from a composite material having a ceramic matrix, such as a carbon/silicon carbide composite, or a silicon carbide/silicon carbide composite. The carbon or silicon carbide fibrous reinforcement material is, for example, composed of circular cloth plies 12 that are piled perpendicularly to the axis of the wheel 10. They may optionally be linked together by needling or by thread implants. The methods of preparing such fibrous reinforcements are in themselves well known and explained, for instance, in U.S. Pat. Nos. 4,790,052 and 4,628,846 and in pending U.S. patent application Ser. No. 416,658 filed on Oct. 3, 1989. The reinforcement is densified by a chemical vapor infiltration process. A description of a process for vapor phase infiltration of silicon carbide can found in patent document FR-A-2 401 888.

After densification, the wheel is machined to its final dimensions, especially as regards forming the wheel's hub 14 and cutting out a drive gear 16 on one (10a) of the wheel's faces 10a and 10b, at the level of the hub. Blades 18 are also cut out at equal distances along the wheel's outer periphery.

The drive gear 16 is formed of equidistant teeth 20 that extend radially and go right round the wheel's axis 11. The teeth are machined by means of a grinder (or a brayer) having a profile matching that of the teeth.

Figure 7:
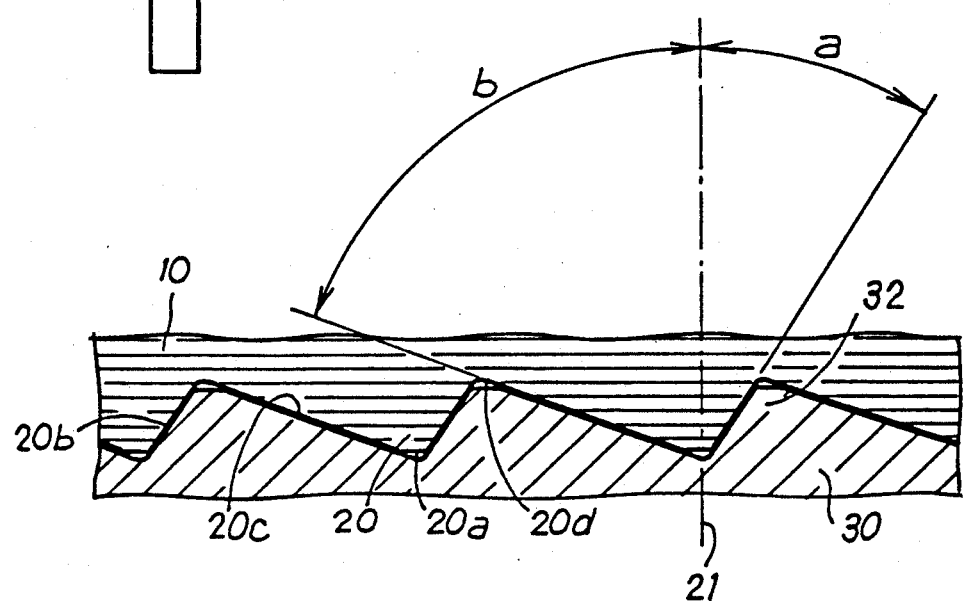
FIG. 7 is a partial detailed view showing the teeth of the turbine wheel and a corresponding drive gearwheel.

According to the invention, each tooth is asymmetric relative to a meridian plane 21 that passes through its apex 20a (see FIG. 7). Thus, each tooth has a first shoulder 20b that subtends an angle a with respect to plane 21, and a second shoulder 20c that subtends with respect to plane 21, angle a being less than angle b.

The "raised" shoulder 20b, which is relatively steeply inclined with respect to face 10a, serves for centring the turbine wheel 10 when the latter is tightened against its drive wheel 30 (FIG. 7) and transmitting a torque between the teeth 32 of the drive wheel 30 and teeth 20. Angle a is preferably chosen to be between 15° and 45°, for instance 35°. The "sunken" shoulder 20c, which is relatively weakly inclined with respect to face 10a, takes up most of the load due to the tightening of drive wheel 30 against wheel 10. Because of the orientation of the shoulders 20c, the strains at the root of the cogs are minimised. Similarly, there is also a minimisation of the interlaminar shear stress susceptible of causing a delamination of the plies forming the composite material's fibrous reinforcement. Angle b is preferably chosen to be between 55° and 85°, for instance 70°.

Preferably also, the sum of angle a and b is at least 100° in order to keep the cog coefficient low.

Advantageously, the lines containing edges 20a of the teeth 20 and the cog roots 20d between the teeth 20 converge towards a common point located on axis 11 (see FIG. 6).

The teeth 32 of wheel 30 have a profile that is complementary to that of teeth 20 and 30. Consequently, any deformation in the teeth, e.g. resulting from thermal effects, will occur isomorphically. Accordingly, an intimate contact is maintained between the shoulders of the cooperating teeth 20 and 32, even if the constituent materials of the respective wheels 10 and 30 have different thermal expansion coefficients.

What is claimed is:

1. A turbine wheel driven by a gear means comprising:
    a composite material hub including a drive gear formed of teeth that extend radially on one face of said wheel, each of said teeth having edges and being asymmetric with respect to a meridian plane passing through an apex thereof, and each of said teeth further having,
    a first shoulder centering the turbine wheel against an abutting face of said gear means and transmitting a drive torque from said gear means to said turbine wheel, said first shoulder subtending an angle substantially in a range of 15° to 45° relative to said meridian plane, and
    a second shoulder absorbing pressure exerted by said gear means and subtending an angle substantially in a range of 55° to 85° relative to said meridian plane,
    said first shoulder and said second shoulder decreasing stresses exerted at a root of each of said teeth and said edges of said teeth and roots of cogs of said gear means between adjacent teeth being on lines that converge to a common point located on an axis of said turbine wheel.

2. The wheel of claim 1, wherein a sum of angles subtended by said first shoulder and by said second shoulder relative to said meridian plane is not less than 100°.

* * * * *

UNITED STATES PATENT AND TRADEMARK OFFICE
CERTIFICATE OF CORRECTION

PATENT NO. : 5,205,716
DATED : April 27, 1993
INVENTOR(S) : Jean-Michel Georges

It is certified that error appears in the above-indentified patent and that said Letters Patent is hereby corrected as shown below:

Title page, item [57]
In the Abstract, line 5, "the" should read --a--.

Column 1, line 6, "Field of the Intention" should read --Field of the Invention--.

Column 1, line 7, "intention" should read --invention--.

Column 1, line 11, "intention" should read --invention--.

Column 2, line 1, "SUMMARY OF THE INVENTION WHIT OBJECTS" should read --Summary of the Invention With Objects--.

Column 2, line 4, "intention" should read --invention--.

Column 2, line 56, "intention" should read --invention--.

Column 3, line 7, "methods of" should read --methods for--.

Column 4, line 3, "angle" should read --angles--.

Column 4, line 41, "of angles" should read --of said angles--.

Signed and Sealed this

Twenty-sixth Day of April, 1994

Attest:

BRUCE LEHMAN

*Attesting Officer*    Commissioner of Patents and Trademarks